United States Patent
Yamamoto et al.

(10) Patent No.: US 9,162,551 B2
(45) Date of Patent: Oct. 20, 2015

(54) REGISTER

(75) Inventors: Masaaki Yamamoto, Aichi (JP);
Hidekazu Makimura, Aichi (JP);
Takamitsu Murohashi, Aichi (JP)

(73) Assignee: HOWA PLASTICS CO., LTD.,
Toyota-Shi, Aichi (JP)

( * ) Notice: Subject to any disclaimer, the term of this patent is extended or adjusted under 35 U.S.C. 154(b) by 631 days.

(21) Appl. No.: 13/574,483

(22) PCT Filed: Mar. 25, 2010

(86) PCT No.: PCT/JP2010/055158
§ 371 (c)(1),
(2), (4) Date: Jul. 20, 2012

(87) PCT Pub. No.: WO2011/089736
PCT Pub. Date: Jul. 28, 2011

(65) Prior Publication Data
US 2012/0291893 A1 Nov. 22, 2012

(30) Foreign Application Priority Data

Jan. 22, 2010 (JP) .................................. 2010-12465

(51) Int. Cl.
*B60H 1/34* (2006.01)

(52) U.S. Cl.
CPC ...... *B60H 1/3428* (2013.01); *B60H 2001/3471* (2013.01); *Y10T 137/8158* (2015.04)

(58) Field of Classification Search
CPC ................ B60H 1/248; B60H 1/3428; B60H 2001/3471; B65D 90/34; B65D 90/32; B65D 90/325

USPC ............ 454/340, 358, 367; 137/68.23, 68.24, 137/68.25

See application file for complete search history.

(56) References Cited

U.S. PATENT DOCUMENTS 3,701,311 A * 10/1972 McLarty ........................ 454/319
5,643,080 A *  7/1997 Kondoh et al. ............... 454/155
7,997,964 B2 *  8/2011 Gehring et al. ............... 454/155

(Continued)

FOREIGN PATENT DOCUMENTS

CA    2474315 A1 *  1/2006
CN    1131264 A     9/1996

(Continued)

OTHER PUBLICATIONS

Chinese Patent Office, Chinese Search Report for Application No. 2010800620466, dated Mar. 6, 2014.

*Primary Examiner* — Steven B McAllister
*Assistant Examiner* — Frances F Hamilton
(74) *Attorney, Agent, or Firm* — Ingrassia Fisher & Lorenz, P.C.

(57) ABSTRACT

A register has a narrow and long air blow outlet long in the longitudinal direction and short in the shorter-side direction, and is provided with a front movable louver along the longitudinal direction inside the air blow outlet. The front movable louver has one vertical fin having an annular fin portion at the center. The annular fin portion is formed so as to have a substantially rectangular opening in an air blowing direction in a front view, and has flat plate portions on both side portions. Upper shaft portions are provided on both end portions of the annular fin portion via upper fin portions, and lower shaft portions are provided via lower fin portions. The upper shaft portions and lower shaft portions are supported turnably on bearing portions of fixed walls.

2 Claims, 10 Drawing Sheets

(56) References Cited

U.S. PATENT DOCUMENTS

| | | | |
|---|---|---|---|
| 2005/0097704 A1* | 5/2005 | Song et al. | 16/110.1 |
| 2008/0119124 A1* | 5/2008 | Okuno | 454/69 |
| 2009/0286462 A1* | 11/2009 | Goto | 454/155 |

FOREIGN PATENT DOCUMENTS

| | | | |
|---|---|---|---|
| DE | 10104428 C2 * | | 9/2003 |
| FR | 2650225 A | | 2/1991 |
| GB | 1322480 A | * | 6/1970 |
| GB | 1375823 A | * | 11/1974 |
| JP | 3156703 U | | 7/1991 |
| JP | 7304331 A | | 11/1995 |
| JP | 8145455 A | | 6/1996 |
| JP | 2004114799 A | * | 4/2004 |
| JP | 3156703 U | * | 1/2010 |
| WO | WO 2011089736 A1 | * | 7/2011 |

\* cited by examiner

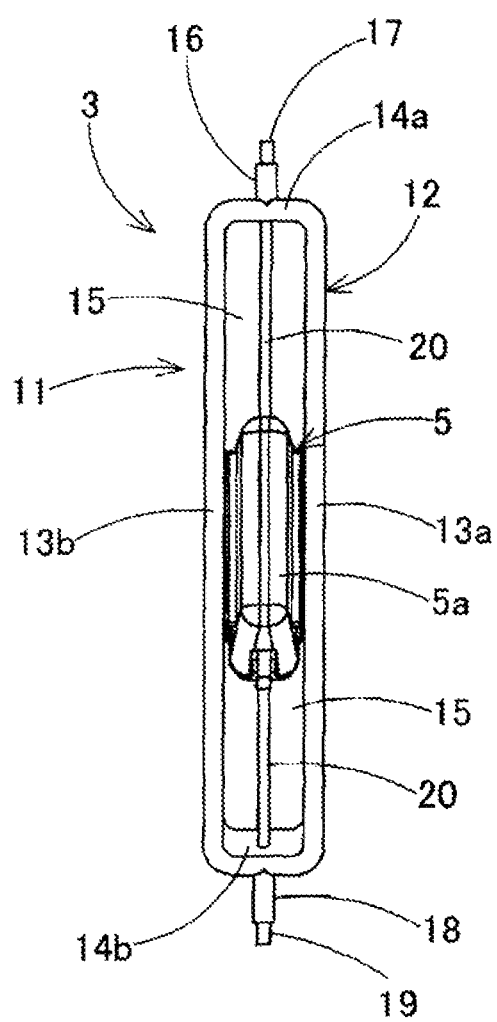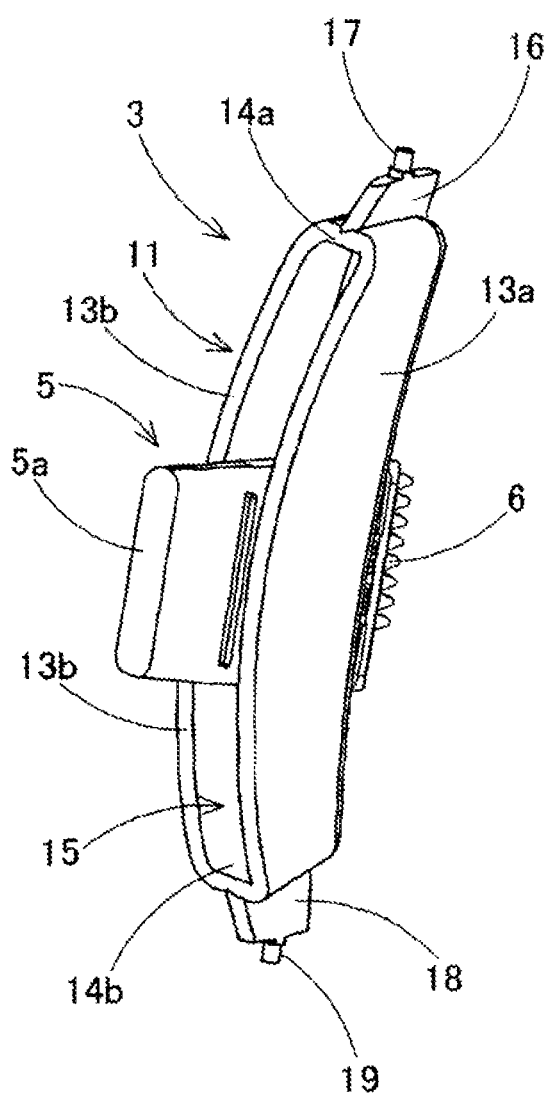
Fig. 6 (a) Fig. 6 (b)

REGISTER

CROSS-REFERENCE TO RELATED APPLICATIONS

This application is a U.S. National-Stage entry under 35 U.S.C. §371 based on International Application No. PCT/JP2010/055158, filed Mar. 25, 2010, and claims priority to Japanese Application No. 2010-12465, filed Jan. 22, 2010, which are all hereby incorporated in their entirety by reference.

TECHNICAL FIELD

The technical field relates to a register for air blow adjustment to be used for an air blow outlet for air conditioning of an automobile, etc., and specifically, to a register which has a narrow and long air blow outlet and a movable louver provided along a longitudinal direction inside the air blow outlet.

BACKGROUND

As a register for air blow adjustment, a register which has a horizontally movable louver and a vertically movable louver disposed on the front and rear sides inside a bezel or retainer forming a ventilation flue, and adjusts an air blowing direction by changing angles of fins of the horizontally movable louver and the vertically movable louver when blowing out air from the air blow outlet provided on the bezel, is provided on an instrument panel, etc., as an air blow outlet of an air conditioning device of an automobile.

In recent years, the design around the instrument panel inside a cabin of an automobile is made in the image which is simple as a whole and provides no feeling of discomfort, and due to the layout of a display which has become larger in size, the space for the air conditioning register is reduced and the air blow outlet of the register tends to be designed as a narrow slit shape which is inconspicuous in terms of design. Such a slit type register has an air blow outlet inevitably having a narrow and long shape long in the longitudinal direction and short in the shorter-side direction, and a front movable louver of the air blow outlet is normally provided with one or two fins along the longitudinal direction (refer to, for example, Japanese Published Unexamined Patent Application No. 2007-331417).

In this register having a narrow and long air blow outlet, the air blow outlet has a narrow and long shape long in the longitudinal direction and short in the shorter-side direction, so that the number of fins of the front movable louver long in the longitudinal direction is inevitably 1 or 2 and is smaller than that of fins of a front movable louver of a normal register. However, in a register having such a narrow and long air blow outlet, when the number of fins along the longitudinal direction becomes as small as, for example, 1 or 2, even when the directions of the fins are changed upward/downward or leftward/rightward along the shorter-side direction of the air blow outlet, it is difficult to sufficiently change the direction of wind upward/downward or leftward/rightward, so that the directivity of wind is poor.

Specifically, in a register provided with an air blow outlet having a narrow and long shape long in the longitudinal direction and short in the shorter-side direction, if the number of fins of the front movable louver becomes as small as 1 or 2, the air flow is narrowed in the up-down direction inside the ventilation flue short in the shorter-side direction, and further narrowed by air resistance caused by the fins. Therefore, air flow having a certain degree of air blow pressure is narrowed in the shorter-side direction when flowing in the ventilation flue, and accelerated straightly and blown out, and accordingly, even when the direction of the fins the number of which is as small as 1 or 2 is changed to the upward direction or the downward direction, straight air flow to be blown from clearances of the fins strongly influences the degree of upward or downward bend of the air blow. Therefore, the air blow hardly bends in the direction of the fins, and when the direction of the fins of the front movable louver is changed, the directivity of air blow is easily deteriorated.

In view of the above-described circumstances, at least one object thereof is to secure excellent air blow directivity in a register which has a narrow and long air blow outlet and one fin provided in the longitudinal direction of the air blow outlet, and to provide a register which can be easily produced with a small number of components. In addition, other objects, desirable features and characteristics will become apparent from the subsequent summary and detailed description, and the appended claims, taken in conjunction with the accompanying drawings and this background.

SUMMARY

To at least achieve the objects described above, a register is provided which has a narrow and long air blow outlet long in the longitudinal direction and short in the shorter-side direction, and is provided with a front movable louver along the longitudinal direction inside the air blow outlet, the front movable louver consists of one fin having an annular fin portion at the center, and the annular fin portion is formed so as to have a substantially rectangular opening in an air blowing direction in a front view, and has flat plate portions on both side portions, shaft portions are provided so as to project from both ends of the annular fin portion via fin portions, and the shaft portions on both ends are supported turnably on bearing portions of fixed walls.

According an embodiment of the register, a front movable louver having one fin axially supported is provided inside the narrow and long air blow outlet, so that even when the air blowing direction is adjusted by changing the angle of the front movable louver, the narrow and long air blow outlet is not narrowed, and an increase in pressure loss and air volume reduction during air blowing can be suppressed. The front movable louver having one fin is provided with an annular fin portion at the center, and flat plate portions are provided on both sides of the annular fin portion, so that when the angle of the annular fin portion of the front movable louver is changed, the direction of air blow reliably changes according to the angles of the flat plate portions on both sides, and excellent air blow directivity can be secured. The front movable louver consists of only one fin, so that the number of components of the register can be minimized and the number of man-hours involved in the assembling work is also reduced during production. Although the number of fins is one, an annular fin portion is provided, so that the internal mechanism of the register is hardly visible from the front of the air blow outlet due to the annular fin portion and the look can be prevented from being deteriorated by the internal mechanism viewable from the front.

Here, preferably, in the register described above, a rear movable louver having a fin orthogonal to the fin of the front movable louver is disposed at the rear of the front movable louver, the annular fin portion at the center of the front movable louver is formed into a rectangular shape narrow and long in a front view, and both end portions of the annular fin portion have sectional shapes along the central axis expanding forward in the air blowing direction.

According to an embodiment, when the angle of the fin of the rear movable louver is adjusted, it becomes hard for wind to interfere with the annular fin portion of the front movable louver, and pressure loss and air volume reduction during air blowing can be suppressed. Preferably, a rear movable louver is disposed at the rear of the front movable louver, an operation knob is inserted in the opening of the annular fin portion so as to be exposed to the front surface and slidable in the longitudinal direction of the annular fin portion, a linkage mechanism to be linked to the rear movable louver is provided on the rear portion of the operation knob, and the angles of the front movable louver and the rear movable louver are adjusted by the operation knob.

According to an embodiment, by operating the operation knob exposed to the front surface of the air blow outlet inside the opening of the annular fin portion, the direction of air blow can be changed upward/downward and leftward/rightward.

According to an embodiment of the register, an annular fin portion is provided at the center of the fin, the annular fin portion has an opening substantially rectangular in a front view and opened in the air blowing direction, and flat plate portions on both side portions, so that when air flow is blown out from the air blow outlet, the air flow flowing through the ventilation flue flows inside the annular fin portion of the front movable louver and around the flat plate portions, and is satisfactorily bent in a fin bending direction of the front movable louver and blown, so that excellent directivity of the wind can be maintained when the direction of the fin is changed. During production, only one fin is attached to the front movable louver, so that the number of components of the register can be minimized and the number of man-hours is reduced that are involved in the assembling work.

BRIEF DESCRIPTION OF THE DRAWINGS

The present invention will hereinafter be described in conjunction with the following drawing figures, wherein like numerals denote like elements, and:

FIG. 6(a) is a front view of a front movable louver,
and FIG. 6(b) is a perspective view of the same.

DETAILED DESCRIPTION

Figure 1:
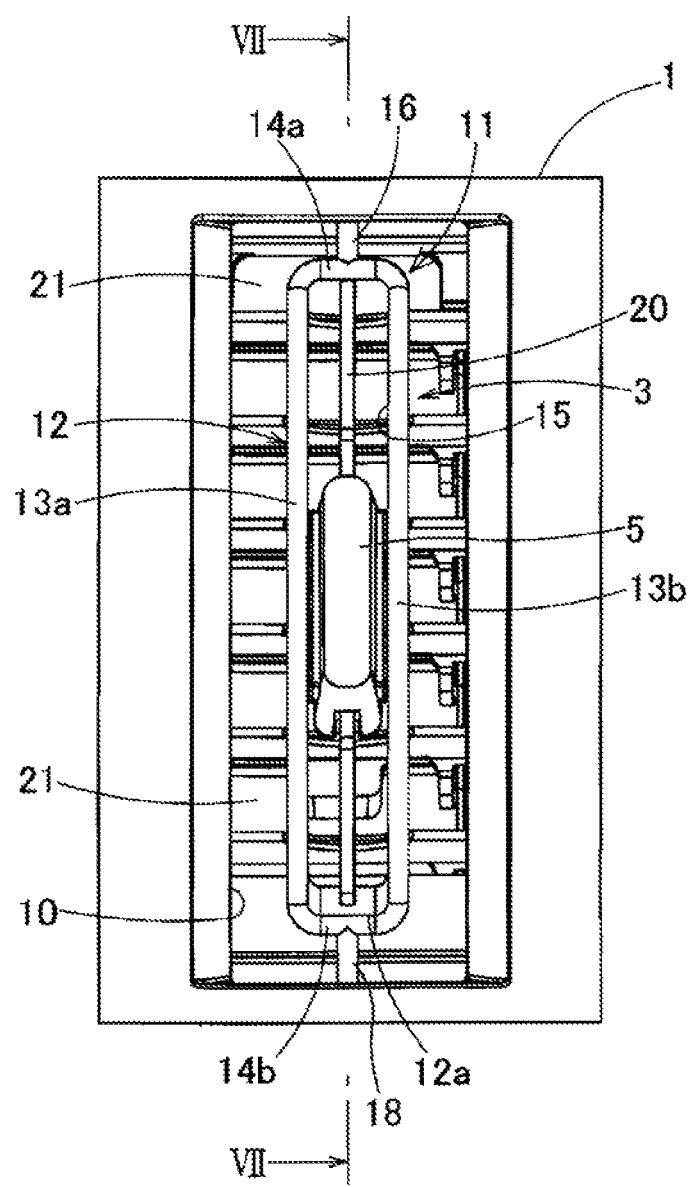
FIG. 1 is a front view of a register showing an embodiment.

The following detailed description is merely exemplary in nature and is not intended to limit application and uses. Furthermore, there is no intention to be bound by any theory presented in the preceding background or summary or the following detailed description.

The register of the embodiment shown in FIG. 1 to FIG. 10 has an air blow outlet 10 provided on the front surface of a bezel 1 joined to the front portion of a retainer 2. Inside the air blow outlet 10, a front movable louver 3 having one vertical fin 11 is disposed to be turnable to the left and right in the longitudinal (vertical) direction, and at the rear (inner side) of the front movable louver 3, a rear movable louver 4 having a plurality (for example, six) of horizontal fins 21 arranged parallel orthogonally to the vertical fin 11 is disposed to be turnable up and down.

Figure 2:
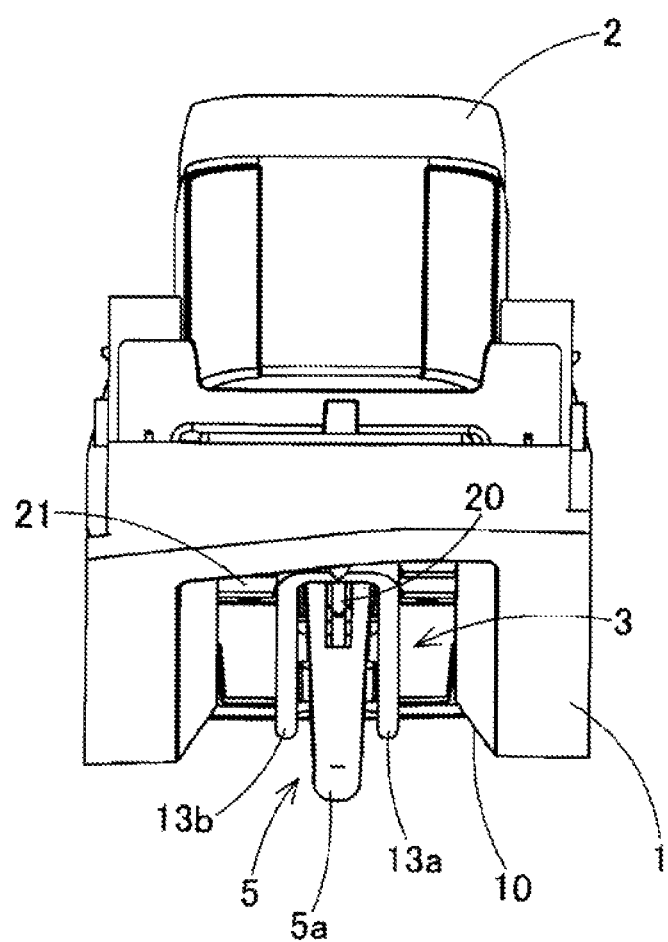
FIG. 2 is a plan view of the same register.
Figure 3:
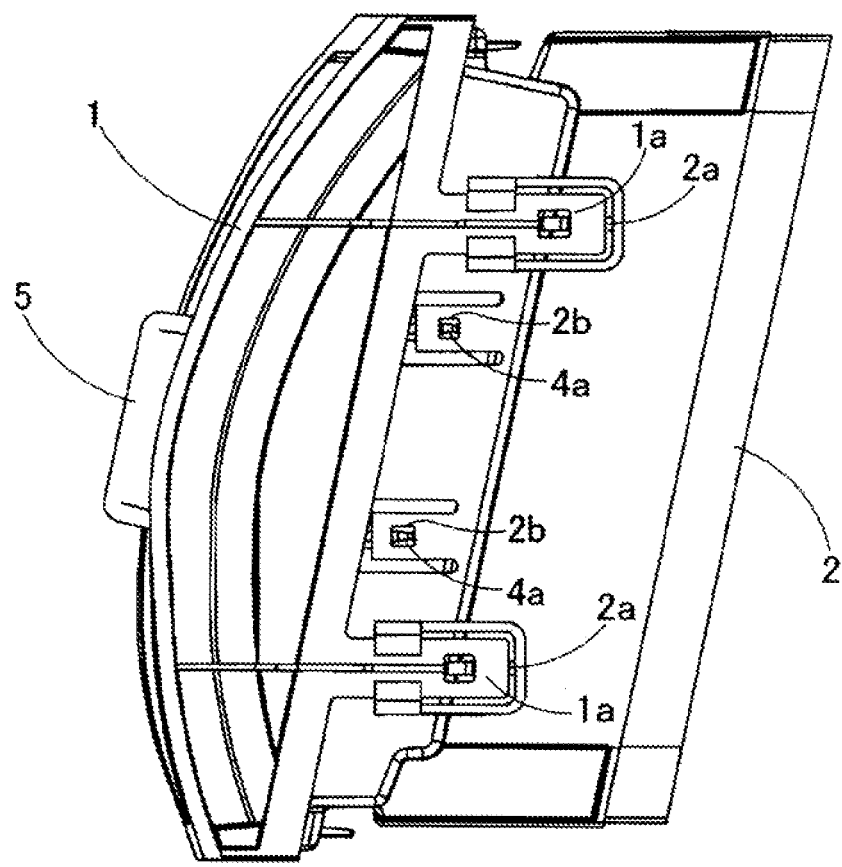
FIG. 3 is a right side view of the same register.
Figure 4:
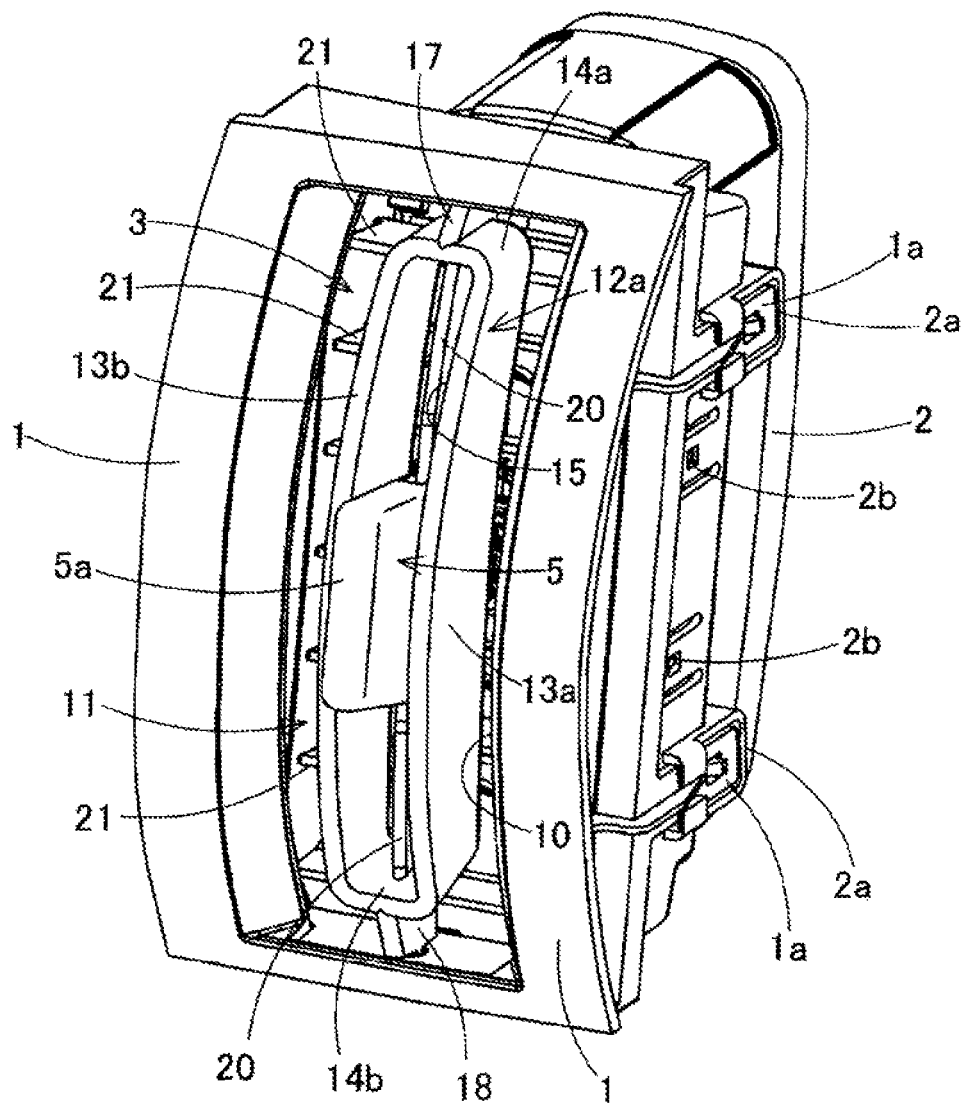
FIG. 4 is a perspective view of the same register.

In the bezel 1 forming the front surface portion of the register, an air blow outlet 10 having a rectangular shape narrow and long vertically is opened, and the air blow outlet 10 is formed into a vertically long rectangular shape long in the longitudinal direction (vertical direction) and short in the shorter-side direction (horizontal direction) as shown in FIG. 1 and FIG. 2. Inside the bezel 1 (back surface side), a rectangular fitting portion for joining to the retainer 2 is provided, and at four positions on both sides of the fitting portion, engagement portions 1a are provided so as to project on the back surface side. The duct-shaped retainer 2 is engaged with the back surface of the bezel 1 by using the engagement portions 1a. Inside the retainer 2, a ventilation flue 9 is formed so as to penetrate through the retainer in the front-rear direction, and the rear movable louver 4 having six horizontal fins 21 are disposed inside the ventilation flue 9.

On side wall portions on both sides of the retainer 2, engagement receiving portions 2a into which the engagement portions 1a of the bezel 1 are inserted and engaged are formed at four positions, and when the air blow outlet 10 of the bezel 1 is fitted to the front portion of the retainer 2 so as to fit the ventilation flue 9 of the retainer 2, the engagement portions 1a of the bezel 1 are inserted and engaged in the engagement receiving portions 2a of the retainer 2, and accordingly, the bezel 1 and the retainer 2 are coupled. These bezel 1 and retainer 2 are coupled in a state where the rear movable louver 4 is fitted to the inside of the retainer 2 and the front movable louver 3 is fitted ahead of the rear movable louver.

Figure 5:
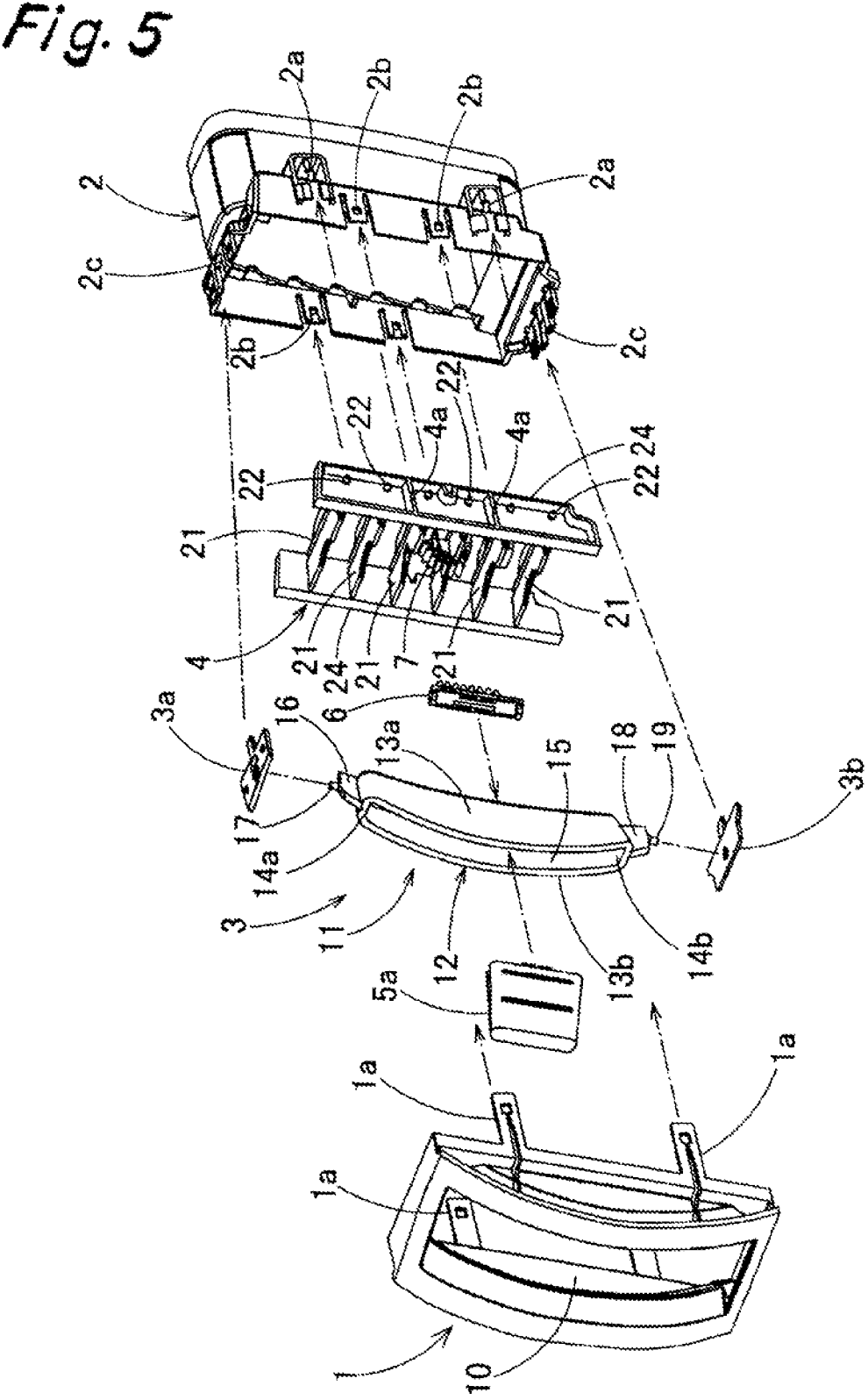
FIG. 5 is an exploded perspective view of the same register.

Specifically, as shown in FIG. 5, on left and right side wall portions of the front portion of the retainer 2, engagement receiving portions 2b for the rear movable louver 4 are formed, and the rear movable louver 4 is fitted to the inside of the retainer 2 by engaging engagement claws 4a of the rear movable louver 4 with the engagement receiving portions 2b. The rear movable louver 4 is configured so that, as shown in FIG. 5, six horizontal fins 21 are disposed horizontally and parallel to each other between two bearing plates 24 disposed vertically on both sides while leaving clearances vertically, and turning shafts 22 of the horizontal fins 22 are axially supported turnably by the bearing plates 24 on both sides.

To fit the rear movable louver 4 to the inside of the retainer 2, the bearing plates 24 on both sides are inserted into the front portion of the retainer 2, and the engagement claws 4a provided on the outsides of the bearing plates 24 are fitted to the inside of the retainer 2 by engaging with the engagement receiving portions 2b, and the horizontal fins 21 of the rear movable louver 4 are allowed to turn up and down inside the retainer 2.

Figure 7:
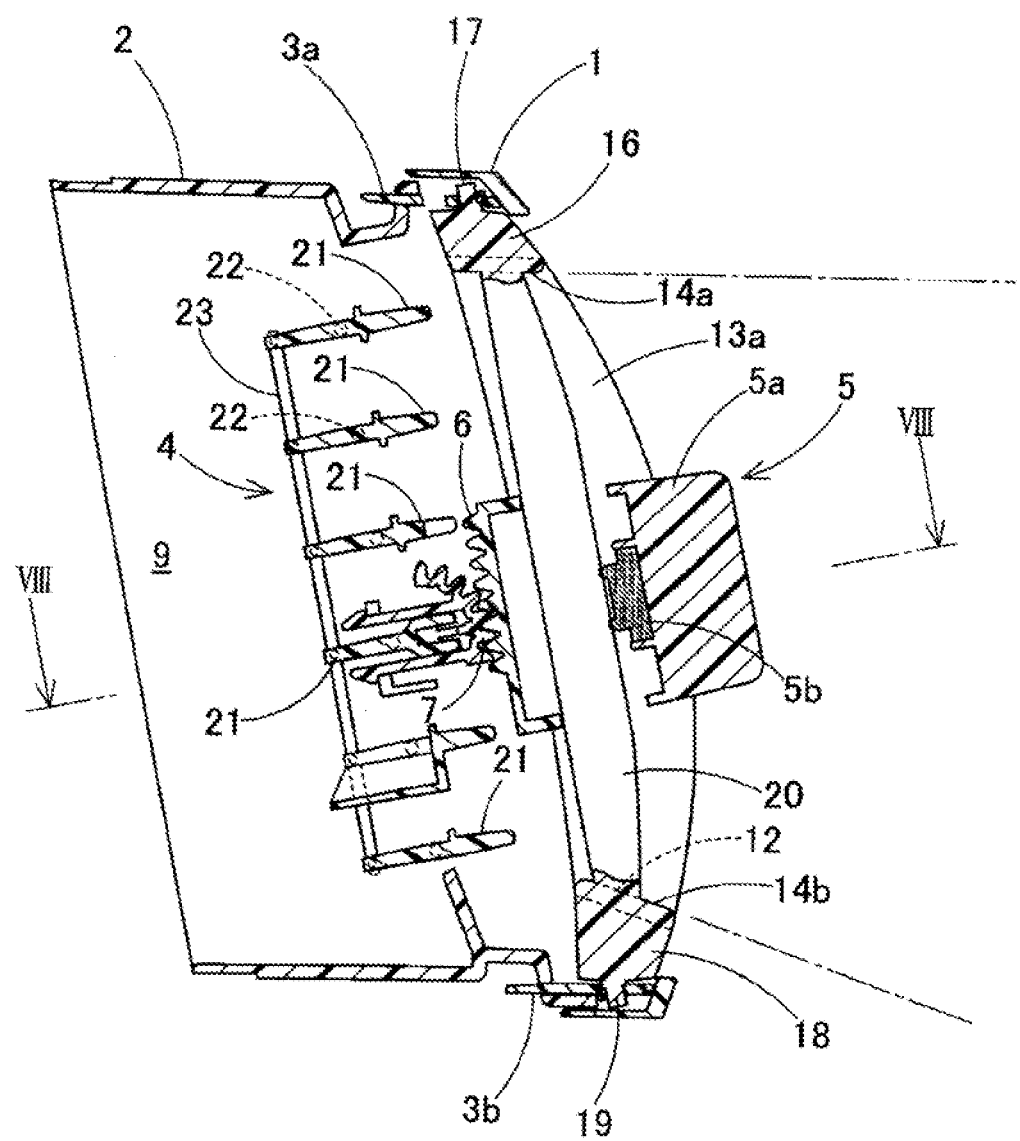
FIG. 7 is a sectional view along VII-VII of FIG. 1.

Further, as shown in FIG. 7, biased shafts are provided so as to project from the rear end portion side surfaces of the horizontal fins 21, one bar-shaped link member 23 is linked to the biased shafts so that all horizontal fins 21 turn in the left-right direction in conjunction with each other when the horizontal fins 21 are turned in the left-right direction by the operation knob 5. Further, as shown in FIG. 5, on the upper front portion and the lower front portion of the retainer 2, fitting portions 2c and 2c are formed to which the bearing portion 3a of the front movable louver 3 is fitted. Into the upper and lower fitting portions 2c and 2c, the bearing portions 3a and 3b which axially support the upper shaft portion 17 and the lower shaft portion 19 of one vertical fin 11 of the front movable louver 3 turnably are fitted. The upper and lower bearing portions 3a and 3b are formed into plate shapes, and shaft holes into which the upper shaft portion 17 or the lower shaft portion 19 is inserted are provided therein, and the front movable louver is fitted by inserting the upper shaft portion 17 and the lower shaft portion 19 of the vertical fin 11 into the shaft holes.

The vertical fin 11 of the front movable louver 3 is inserted vertically into the front portion of the retainer 2 in a state where the bearing portions 3a and 3b are fitted to the upper shaft portion 17 and the lower shaft portion 19, and the bearing portions 3a and 3b are fitted to the fitting portions 2c of the retainer 2 serving as fixed walls, and accordingly, the vertical fin 11 is fitted. The vertical fin 11 of the front movable louver 3 consists of, as shown in FIG. 6, one fin having an annular fin portion 12 at the center. The annular fin portion 12 has an opening 15 substantially rectangular in a front view opened in the air blowing direction, and flat plate portions 13a and 13b on both side portions, and by a joint portion 14a on the upper portion and a joint portion 14b on the lower portion, the annular fin portion 12 is formed into a substantially rectangular frame shape connecting both flat plate portions 13a and 13b.

The flat plate portions 13a and 13b on both sides of the annular fin portion 12 have flat surfaces having sufficient areas on both sides thereof, and can maintain excellent directivity of air blow according to adjustment of the direction of the vertical fin 11 when blowing air. In particular, the inner surface of the joint portion 14b on the lower portion is inclined toward the diagonally lower front side so that the air blowing direction is guided to the diagonally lower front side when the rear movable louver 4 is directed downward.

Figure 9:
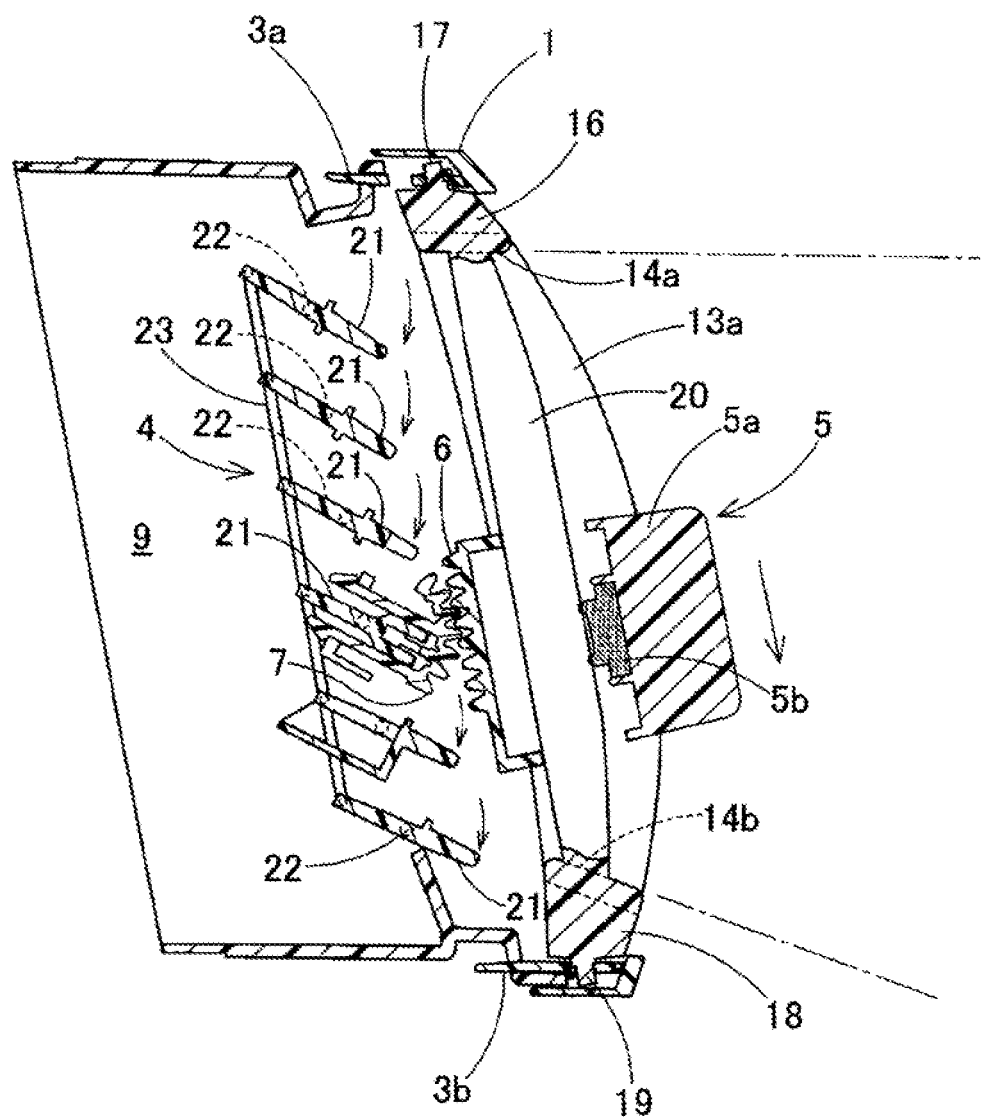
FIG. 9 is a sectional view along VII-VII in a state where the directions of horizontal fins of the rear movable louver are changed downward.

Specifically, the annular fin portion 12 is inclined to the lower front side so that the shape of the joint portion 14b on the lower portion expands forward in the air blowing direction in a sectional view of the annular fin portion 12 along the central axis in the vertical direction. Thus, by forming the joint portion 14b on the lower portion of the annular fin portion 12 diagonally downward so as to expand forward, as shown in FIG. 9, when the horizontal fins 21 of the rear movable louver 4 are directed downward, diagonally downward directivity of the air blow can be maintained without disturbance of the air flow.

In this annular fin portion 12, the inner surface of the joint portion 14a on the upper portion is formed parallel to the front surface as shown in FIG. 7, and only the joint portion 14b on the lower portion expands forward, however, it is also allowed that the inner surface of the joint portion 14a on the upper portion is inclined upward and expands forward similar to the joint portion 14b on the lower portion. When the front surface shape of the annular fin portion 12 is substantially rectangular, in terms of design performance, the joint portion 14a on the upper portion and the joint portion 14b on the lower portion may also be formed to have acute angles so as to constitute a part of a hexagon, or may be formed into semicircular shapes.

Further, as shown in FIG. 6, on the vertical central axis inside the annular fin portion 12 provided with flat plate portions 13a and 13b on both sides, a guide plate 20 is provided so as to divide vertically the center of the rectangular opening 15. Onto this guide plate 20, the operation knob 5 is fitted slidably as shown in FIG. 7 and FIG. 9, and the guide plate 20 guides the vertical sliding of the operation knob 5. The operation knob 5 is structured so that while the operation knob 5 turns the horizontal fins 21 of the rear movable louver 4 up or down via a teeth portion 6 and a sector gear 7, the operation knob 5 changes the direction of the vertical fin 11 of the front movable louver 3 to the left or right in response to an operation in the left-right direction of the operation knob 5.

Further, one upper fin portion 16 is provided so as to project from the upper end of the annular fin portion 12, and one lower fin portion 18 is provided so as to project from the lower end of the annular fin portion 12, the upper shaft portion 17 is provided on the tip end of the upper fin portion 16, and the lower shaft portion 19 is provided so as to project from the tip end of the lower fin portion 18. The upper shaft portion 17 and the lower shaft portion 19 are positioned on one axis passing through the central axis of the vertical fin 11, and as shown in FIG. 5, the upper shaft portion 17 and the lower shaft portion 19 are inserted and fitted into shaft holes of the plate-shaped bearing portions 3a and 3b. The upper fin portion 16 and the lower fin portion 18 may also be structured so as to have openings to prevent interference of wind when the vertical fin 11 is turned to the left or right.

When the front movable louver 3 is fitted to the front portion of the retainer 2, in a state where the bearing portions 3a and 3b are fitted to the upper shaft portion 17 and the lower shaft portion 19, the front movable louver 3 is fitted turnably to the inside of the front portion of the retainer 2 by fitting the bearing portions 3a and 3b to the upper wall portion and the lower wall portion of the front portion of the retainer 2.

The operation knob 5 is configured by fitting the rack-shaped teeth portion 6 to the rear portion of the knob main body 5a as shown in FIG. 5, and when the operation knob 5 is fitted to the front movable louver 3, the knob main body 5a and the teeth portion 6 are fitted to the guide plate 20 so as to sandwich the guide plate 20 of the annular fin portion 12 from the front side and the rear side. As shown in FIG. 7, a rubber-like elastic member 5b is fitted to the inside of the knob main body 5a so as to come into contact with the guide plate 20, and when the operation knob 5 is slid along the guide plate 20, the rubber-like elastic member 5b causes appropriate sliding resistance, and an appropriate operation load can be obtained. The operation knob 5 is fitted slidably so as to sandwich the guide plate 20 from the front and rear sides by the knob main body 5a and the teeth portion 6, however, instead of the guide plate inside the annular fin portion 12, a guide portion capable of guiding the operation knob may be provided inside the annular fin portion 12.

The teeth portion 6 provided on the rear portion of the operation knob 5 engages with a sector gear 7 positioned at the intermediate portion of the rear movable louver 4 and fitted to one horizontal fin 21 to constitute a linkage mechanism, and as shown in FIG. 9, when the operation knob 5 is slid vertically, the direction of the horizontal fin 21 is changed vertically via the teeth portion 6 and the sector gear 7. For the linkage mechanism consisting of the teeth portion 6 and the sector gear 7, a link member may be used instead of the gear. Thus, vertical sliding of the operation knob 5 turns the horizontal fins 21 via the teeth portion 6 and the sector gear 7, and one link member 23 is joined to the biased shafts of all horizontal fins 21, and accordingly, when one horizontal fin 21 is turned up or down around the turning shaft 22 by the operation knob 5, the directions of the vertical fins 11 of the rear movable louver 4 are changed at a time.

In detail, as shown in FIG. 7, the sector gear 7 is fitted to the horizontal fin 21 which is the third fin in order from the lowest fin of the rear movable louver 4 so as to project forward, and this sector gear 7 engages with the teeth portion 6 on the rear portion of the operation knob 5 of the front movable louver 3 positioned ahead of the sector gear 7. The width of the teeth portion 6 is formed to be sufficiently wide, so that even in the state where the vertical fin 11 of the front movable louver 3 is turned by moving the operation knob 5 to the left/right, the engagement between the teeth portion 6 and the sector gear 7 is kept so that the horizontal fins 21 of the rear movable louver 4 is allowed to turn up and down.

The register configured as described above is fitted to the portion of the instrument panel or dashboard inside the cabin of an automobile by connecting the terminal end of the retainer 2 to a ventilation duct not shown. Air fed from the ventilation duct is blown out from the ventilation flue 9 inside the retainer 2 through the air blow outlet 10.

Figure 8:
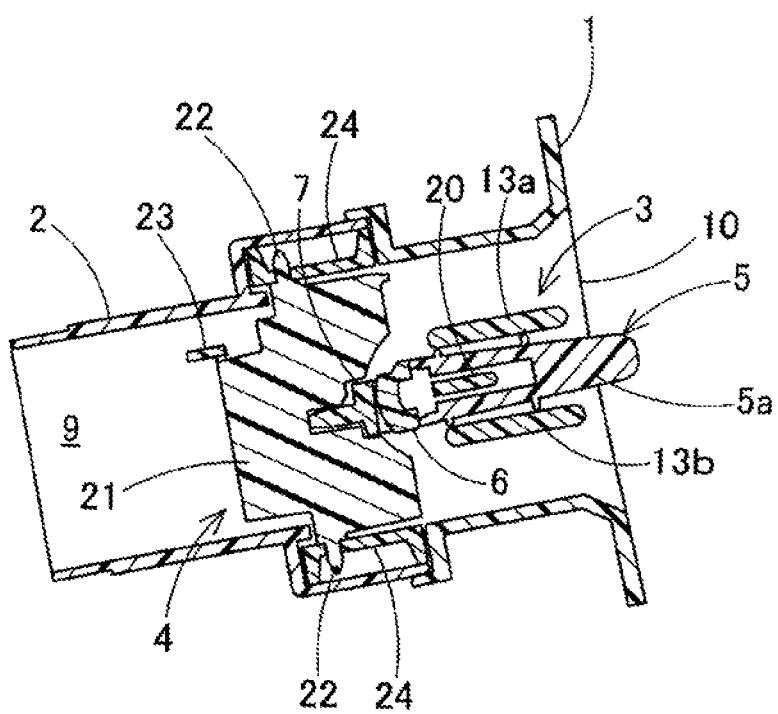
FIG. 8 is a sectional view along VIII-VIII of FIG. 6.

As shown in FIG. 7 and FIG. 8, in the state where the vertical fin 11 of the front movable louver 3 and the horizontal fins 21 of the rear movable louver 4 are set parallel to the air blowing direction in the ventilation flue 9, an air flow advances straight inside the ventilation flue 9, passes through the portions between the vertical fin 11 and the horizontal fins 21, and is blown out forward from the air blow outlet 10. At this time, pressure loss of the air flow flowing around the front movable louver 3 when being blown becomes smaller due to the only one vertical fin 11, so that wind noise can also be reduced.

To adjust the air blowing direction upward or downward, the operation knob 5 is adjusted by being moved up or down. When the operation knob 5 is held and moved up or down, the operation knob 5 slides on the guide plate 20 inside the annular fin portion 12 of the vertical fin 11 and moves up or down. Accordingly, the teeth portion 6 on the rear portion of the operation knob 5 transmits the turning force to the horizontal fin 21 of the rear movable louver 4 via the sector gear 7, and the horizontal fin 21 turns up or down around its turning shaft 22. At this time, the turning force is transmitted to other horizontal fins 21 via the link member 23, and the horizontal fins 21 turn around their turning shafts 22, directions of all horizontal fins 21 changes around their turning shafts 22, and accordingly, the air blowing direction is adjusted upward or downward.

For example, when the operation knob 5 is moved down, as shown in FIG. 9, the horizontal fins 21 of the rear movable louver 4 turn around their turning shafts 22 via the teeth portion 6 and the sector gear 7, the directions of all horizontal fins 21 are changed diagonally downward around the turning shafts 22, and accordingly, the wind is directed downward the diagonally lower front side and blown. In this case, a major volume of the air flow passes through the inside of the annular fin portion 12 of the vertical fin 11 of the front movable louver 3, however, as shown in FIG. 9, the inner surface of the joint portion 14*b* on the lower portion of the annular fin portion 12 is directed diagonally downward and shaped so as to expand forward, so that even when the directions of the horizontal fins 21 are turned downward, a sufficient air volume can be blown with excellent directivity.

On the other hand, to adjust the air blowing direction to the right or left, the operation knob 5 of the front movable louver 3 is adjusted by being turned to the right or left. When the operation knob 5 is held and turned to the right or left, the vertical fin 11 of the front movable louver 3 to which the operation knob 5 is fitted turns to the left or right around the upper shaft portion 17 and the lower shaft portion 19, the direction in the left-right direction of the vertical fin 11 changes, and the air blowing direction is adjusted leftward and rightward.

Figure 10:
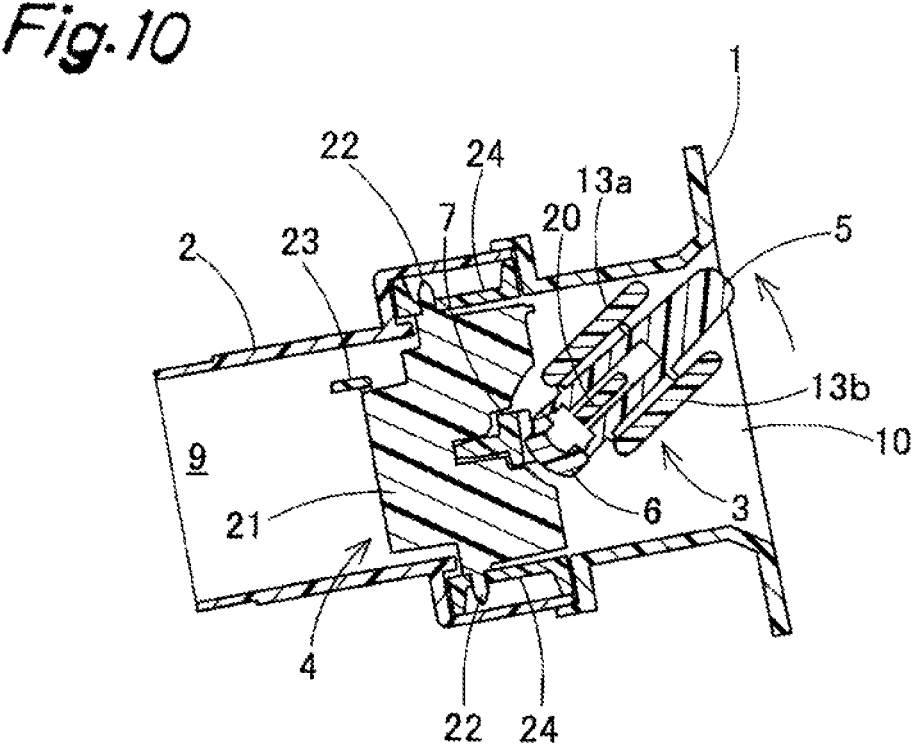
FIG. 10 is a sectional view along VIII-VIII when the front movable louver is directed rightward.

As shown in FIG. 10, when the operation knob 5 is turned to, for example, the right to direct the vertical fin 11 of the front movable louver 3 rightward, in the front portion of the ventilation flue 9, an air flow flowing in the ventilation flue 9 passes through the annular fin portion 12 of the vertical fin 11 directed toward the diagonally front right side and bent to the right, and blown from the air blow outlet 10.

At this time, most of the air flow to be blown from the air blow outlet 10 flows around the annular fin portion 12 of the vertical fin 11, and in particular, the annular fin portion 12 is provided with flat plate portions 13*a* and 13*b* on both sides, so that the air flow flowing inside and outside the annular fin portion 12 is bent toward the direction of the vertical fin 11 by the flat plate portions 13*a* and 13*b* and blown with excellent directivity. Thus, even in the register which has the vertically narrow and long air blow outlet 10 and one vertical fin 11 provided in the front portion of the ventilation flue 9 as the front movable louver 3, when the vertical fin 11 is changed in direction, the air flow is reliably changed toward the direction of the vertical fin 11, so that the directivity of the wind when the vertical fin 11 is adjusted can be maintained excellent. Further, the front movable louver 3 having the vertical fin 11 including the annular fin portion 12 is disposed on the air blow outlet 10, so that although only one vertical fin 11 is provided, the horizontal fins 21 of the rear movable louver 4 positioned on the rear side are hardly visible from the front of the register due to the flat plate portions 13*a* and 13*b* of the annular fin portion 12, so that the register looks excellent and the design performance of the slit-type register can be improved.

In the embodiment described above, in the register having a vertically long air blow outlet 10, the front movable louver 3 is provided with a vertical fin 11, and the rear movable louver 4 is provided with horizontal fins 21, however, a configuration is also possible in which these components are rotated by 90 degrees and a horizontally long air blow outlet is provided, the front movable louver is provided with one horizontal fin and the rear movable louver is provided with a plurality of vertical fins arranged parallel. In the embodiment described above, a rectangular air blow outlet 10 is provided, however, it is not necessarily rectangular, and an air blow outlet having a different narrow and long shape like an oval is also possible.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A register comprising:
a bezel mounted in the front of a retainer and having an air blow outlet;
a front movable louver disposed inside of said air blow outlet of the bezel having an annular fin portion at its center and flat plate portions such that a substantially rectangular opening is formed in said annular fin portion in an air blowing direction in a front view;
a rear movable louver disposed at the rear of said front movable louver and having fins orthogonal to the fin of said front movable louver;
shaft portions configured to project from both ends of said annular fin portion via fin portions, wherein said shaft portions on both ends are turnably supported at bearing portions of fixed walls;
a guide plate disposed in the center of the front movable louver, dividing the opening of said annular fin portion in the longitudinal direction, such that the guide plate is co-linear with said fin portions;

an operation knob exposed to a front surface and inserted inside the opening of said annular fin portion and slidably onto said guide plate, the operation knob configured to engage a gear portion fitted on one of said rear movable louver, and a linkage mechanism configured to link with said rear movable louver provided at the rear of said rear movable louver;

wherein the angles of said front movable louver and said rear movable louver are adjustable via the turning or sliding operation of said operation knob.

2. The register according to claim 1, wherein joint portions are provided with the both ends of said annular fin portion so as to join said flat plate portions on the both sides of said annular fin portions, and said joint portions have a cross-sectional shape expanding forward in the air blowing direction.

* * * * *